United States Patent
Assmann et al.

(10) Patent No.: US 12,531,282 B2
(45) Date of Patent: Jan. 20, 2026

(54) BATTERY MODULE FOR CONSTRUCTING A BATTERY SYSTEM FOR A VEHICLE

(71) Applicant: WEBASTO SE, Stockdorf (DE)

(72) Inventors: Patrick Assmann, Stockdorf (DE); Björn Langhof, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 715 days.

(21) Appl. No.: 17/801,142

(22) PCT Filed: Feb. 19, 2021

(86) PCT No.: PCT/EP2021/054196
§ 371 (c)(1),
(2) Date: Aug. 19, 2022

(87) PCT Pub. No.: WO2021/165490
PCT Pub. Date: Aug. 26, 2021

(65) Prior Publication Data
US 2023/0070899 A1 Mar. 9, 2023

(30) Foreign Application Priority Data

Feb. 19, 2020 (DE) ...................... 10 2020 104 375.9

(51) Int. Cl.
*H01M 10/42* (2006.01)
*H01M 10/48* (2006.01)

(52) U.S. Cl.
CPC ..... *H01M 10/4257* (2013.01); *H01M 10/482* (2013.01); *H01M 2010/4278* (2013.01); *H01M 2220/20* (2013.01)

(58) Field of Classification Search
CPC .......... H02J 7/00; H02J 7/0042; H02J 7/0052; H02J 7/0063; H01M 10/42;
(Continued)

(56) References Cited

U.S. PATENT DOCUMENTS

| 2003/0085621 A1* | 5/2003 | Potega ..................... G06F 1/26 307/18 |
| 2009/0009176 A1* | 1/2009 | Nakao .................. G01R 31/396 324/432 |

(Continued)

FOREIGN PATENT DOCUMENTS

| DE | 10 2010 033545 | 2/2012 |
| DE | 10 2015 204301 | 9/2016 |
| DE | 10 2015 224485 | 6/2017 |

OTHER PUBLICATIONS

PCT International Search Report for PCT Application No. PCT/EP2021/054196 dated May 31, 2021; 13 pages.
(Continued)

*Primary Examiner* — Van T Trieu
(74) *Attorney, Agent, or Firm* — Haynes and Boone, LLP

(57) ABSTRACT

A battery module for constructing a battery system for a vehicle includes at least one battery cell and a battery management controller (BMC) with a battery management controller interface (BMCS). The battery management controller interface (BMCS) has at least two address contacts for allocating an address to the battery module, and the battery management controller (BMC) is designed and configured to detect the assignment of the address contacts and derive therefrom an address for the battery module.

12 Claims, 9 Drawing Sheets

(58) Field of Classification Search
CPC ............. H01M 10/4207; H01M 10/48; H01M 10/482; G01R 31/36; G01R 31/396
See application file for complete search history.

(56) References Cited

U.S. PATENT DOCUMENTS

2013/0057293 A1* 3/2013 Miyamoto ........... G01R 31/396
324/433
2015/0270727 A1* 9/2015 Fukute .................. H02J 7/0042
320/107

OTHER PUBLICATIONS

Office Action for German Patent Application No. 10 2020 104 375.9 dated Jan. 21, 2021; 9 pages.

* cited by examiner

Figure 2

| ADR4 | ADR3 | ADR2 | ADR1 | Dec | ECU type | ECU sub type | Pack ID | Pack Name |
|---|---|---|---|---|---|---|---|---|
| 1 | 1 | 1 | 1 | 15 | BMS | Standalone | 0 | 1_1 |
| 1 | 1 | 1 | 0 | 14 | BMS | Slave | 12 | 2_6 |
| 1 | 1 | 0 | 1 | 13 | BMS | Slave | 11 | 2_5 |
| 1 | 1 | 0 | 0 | 12 | BMS | Slave | 10 | 2_4 |
| 1 | 0 | 1 | 1 | 11 | BMS | Slave | 9 | 2_3 |
| 1 | 0 | 1 | 0 | 10 | BMS | Slave | 8 | 2_2 |
| 1 | 0 | 0 | 1 | 9 | BMS | Slave | 7 | 2_1 |
| 1 | 0 | 0 | 0 | 8 | VIB | 800V (2sXp) | 0 | - |
| 0 | 1 | 1 | 1 | 7 | BMS | Slave | 6 | 1_7 |
| 0 | 1 | 1 | 0 | 6 | BMS | Slave | 5 | 1_6 |
| 0 | 1 | 0 | 1 | 5 | BMS | Slave | 4 | 1_5 |
| 0 | 1 | 0 | 0 | 4 | BMS | Slave | 3 | 1_4 |
| 0 | 0 | 1 | 1 | 3 | BMS | Slave | 2 | 1_3 |
| 0 | 0 | 1 | 0 | 2 | BMS | Slave | 1 | 1_2 |
| 0 | 0 | 0 | 1 | 1 | BMS | Slave | 0 | 1_1 |
| 0 | 0 | 0 | 0 | 0 | VIB | 400V (1sXp) | 0 | - |

"1" means only standard internal pull-up resistance (no external wiring)
"0" means external short-circuit to ground inside the cable harness/plug

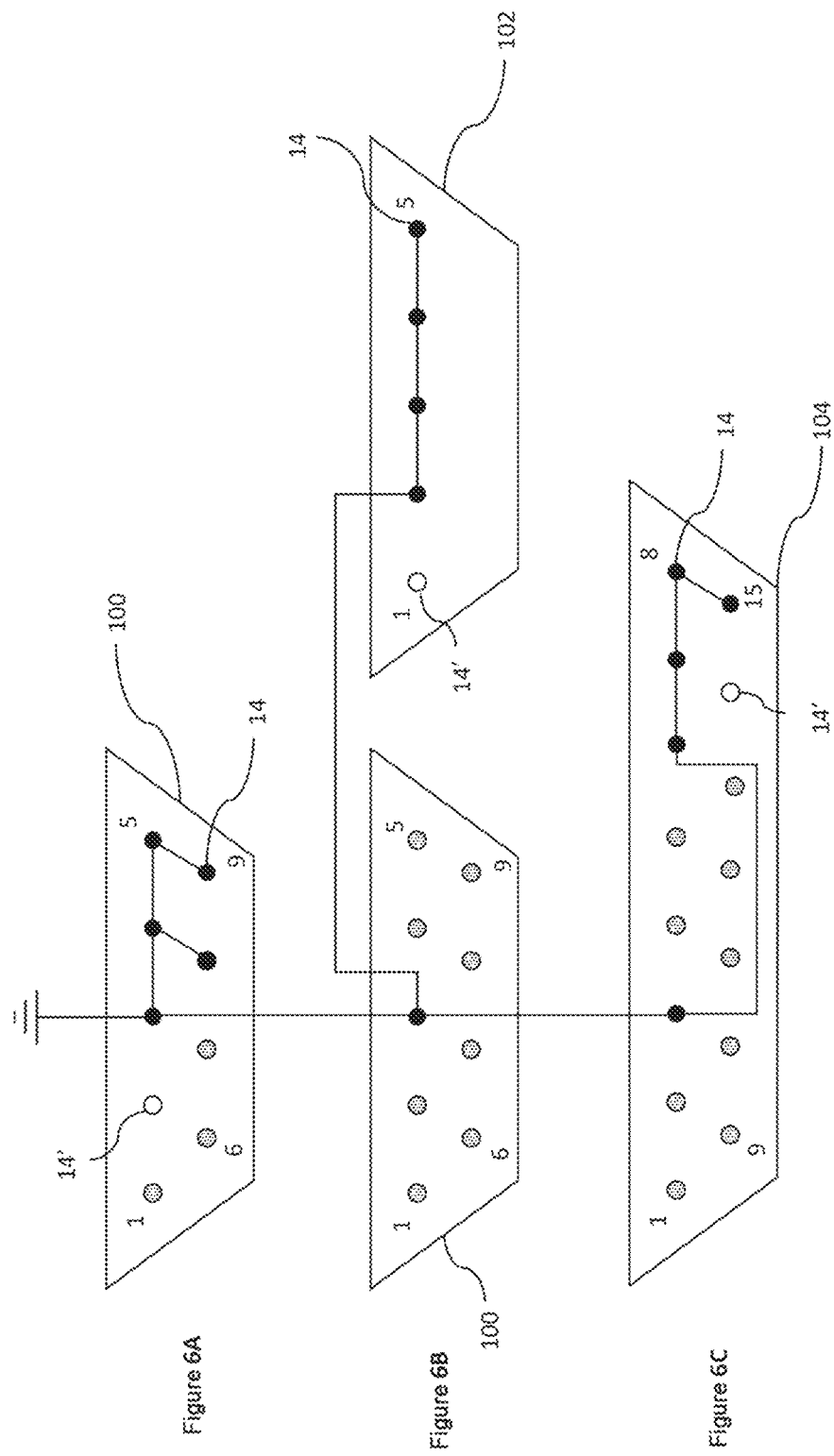

BATTERY MODULE FOR CONSTRUCTING A BATTERY SYSTEM FOR A VEHICLE

CROSS REFERENCE TO RELATED APPLICATIONS

This application is a national stage of International Application No. PCT/EP2021/054196 filed Feb. 19, 2021, which claims priority from German Patent Application No. DE 10 2020 104 375.9 filed Feb. 19, 2020 in the German Patent and Trademark Office, the disclosures of which are incorporated herein by reference in their entirety.

BACKGROUND

Technical Field

The present invention relates to a battery module for constructing a battery system for a vehicle, and to a cable harness with a plurality of connectors for connecting a plurality of battery modules, and to a battery system with at least one battery module and a cable harness, and to a method for communicating between a central control unit and at least one battery module.

Related Art

In order to increase the range and power of electric vehicles, a plurality of high-voltage storage cells which are organized into battery modules, also referred to as battery packs, or into battery packs, are typically interconnected electrically, in any desired configuration in series or in parallel, for example 1sXp or 2sXp, to form a battery system. The battery modules are usually high-voltage storage cells with a voltage of 400V or 800V.

It must be possible for each battery module in the battery system to be unambiguously allocated and detected for implementing and ensuring stable communication and functioning.

This allocation is typically performed by a central and higher-level control device which can be integrated in one of the installed battery modules or alternatively in a separate switch box, for example a so-called "vehicle interface box". The higher-level control device then ensures by means of a master-and-slave principle that each battery module is unambiguously detected.

The individual battery modules can be addressed using many different methods. In each case, an unambiguous identifier, in particular an unambiguous address, must here be allocated to each battery module.

There are two established addressing methods for solving this problem: either the address is hard-coded into the battery module at the start or the addressing of the battery modules is controlled in a dynamic method.

A disadvantage of static battery module address allocation is that, in the event of an error, the system is no longer capable of starting up. The error must then be remedied manually in the battery system. This requires a lot of effort at least when battery systems have already been delivered to the end user and integrated into the vehicle.

In a dynamic method, for each start-up process an unambiguous ID is allocated over and over again, for example, to each battery module. A disadvantage of such a dynamic solution is that a certain amount of time is required during each start-up process for accurately allocating the addresses and identifiers. However, usually the end user would like to start the vehicle and use it immediately without any waiting time. In addition, the complexity of the software and the accompanying development and protection effort of the system are considerably increased. Moreover, when dynamically allocating an address, it is harder to analyze the state of an individual battery module because the address of the battery module can change over its lifetime.

Irrespective of whether an address is allocated to a battery module dynamically or statically, the prior concepts usually only support a specific high-voltage topology. The prior concepts are thus very inflexible. In the event of changes to the high-voltage topology, the source code or the hardware of the central control unit therefore always have to be adapted.

SUMMARY

An improved device for allocating an address to a battery module, and a corresponding method are described herein according to various embodiments.

Accordingly, a battery module for constructing a battery system for a vehicle is proposed, wherein the battery module has at least one battery cell and a battery management controller with a battery management controller interface, wherein the battery management controller interface has at least two address contacts for assigning an address to the battery module; and the battery management controller is designed and configured to detect an assignment of the address contacts and derive therefrom an address for the battery module.

A battery module is an interconnection of battery cells, wherein the latter store electrical energy, in one embodiment, in the form of chemical energy. A battery cell can, for example, be a lithium-iron phosphate cell. When interconnecting battery cells, the capacity and the voltage of the battery module can be varied depending on the circuit. Different battery cells can be interconnected to form battery modules depending on the intended use.

A battery module is herein understood to mean a subunit of a battery system, wherein a plurality of battery cells are interconnected in a battery module. A battery module as it is understood here can also comprise a combination of a plurality of such subunits. In other contexts, such a combination is also referred to as a battery pack but this too falls here under the definition of a battery module.

A battery module usually comprises a battery management controller which is responsible for interconnecting the respective subunits and monitoring and controlling them, or at least one cell measuring device for measuring the state of the battery cell(s).

In another definition of the hierarchy of the modules, a battery module comprises at least one battery cell and a cell measuring device for measuring the state of the battery cell(s). A plurality of battery modules are combined to form a battery pack, wherein the battery pack comprises a battery management controller which is configured for interconnecting, controlling, and monitoring the battery modules in the battery pack. A plurality of battery packs are then combined to form a battery system supplying energy to the vehicle.

In the definition used here, for the sake of simplicity, the hierarchical levels of the battery module and the battery pack are equivalent and referred to as a "battery module".

Different battery modules can then be interconnected to form a battery system. These battery systems can then be used, for example, in vehicles, wherein the interconnections used and the number of battery modules and/or cells can differ depending on the intended use. The battery systems used in vehicles are in principle also suited for the stationary storage of energy.

A vehicle is any means of locomotion which has an electric engine. Thus, for example, a passenger car is a vehicle but so too, within the sense of the claim, are, inter alia, trucks, busses, aircraft such as fixed-wing aircraft or rotor-wing aircraft, boats, submarines, e-scooters, e-bikes, electric bikes in the form of pedalecs, or golf carts.

If the battery is used by, for example, energy being removed by a motor, the battery discharges. A battery management controller monitors the state of the battery modules on which the battery is based, regulates the removal of energy from the different battery modules, and protects the battery modules from, for example, deep discharging. A battery management controller can here be associated with the whole battery system or with the individual battery modules or with the individual cells or combinations thereof.

In order to control the charging and discharging currents, it is, however, important that, for example, the individual battery modules can be identified unambiguously such that the respective battery modules can be controlled accordingly. For this purpose, the battery management controller can have a battery management controller interface which has at least two address contacts. The battery management controller detects assignment of the address contacts and can thereby, for example, allocate an address to the battery module.

It is thus possible, for example, for an unambiguous address to be allocated to each battery module of a group consisting of a plurality of battery modules using the assignment of the respective address contacts. In particular, the battery management controller also allocates itself an address in the whole group, on the basis of the address contact assignment, such that the controller can also itself be addressed via the address at the battery management controller interface.

A controller, in particular a battery management controller, is a control unit. A controller can here be software which is loaded into existing hardware but can also be a hardware component which is connected to an existing hardware component. It can, however, also be a hardware component which is included during the production of an already known hardware component in parallel in the circuit layout. It can, however, also be a hardware component which is integrated together with an already known hardware component. In particular, the hardware component performs its function only by means of the software.

In particular, the use of a battery module can also mean that the hardware and/or software at least partially has a modular structure. In particular, a modular structure can also mean that the whole system is also capable of functioning without the battery module but does not have the desired improvements. In particular, a modular structure can also mean that the battery module can be attached to existing systems.

In particular, a modular structure can also mean that different systems and devices, in particular battery systems, switch units, and control systems and control software can be equipped with the module and then have the same basic design on the basis of which data and information can be exchanged.

The controller has an interface. An interface is a connecting unit which makes it possible to communicate information to the controller which can then be processed in the controller.

The interface has at least two address contacts. An address contact is here, for example, a conductive connection of the interface at which the controller can take measurements of one or more physical variables. Physical variables are, for example, the resistance, the conductance, and/or the electrical potential of the address contact.

The at least two address contacts can be used to allocate an address to the battery module. An address is here a combination of specific and defined physical variables. Additionally, an address is unique within the communication scope of the controller, i.e. the system, such that unambiguous identification of a module is possible. The address can here be allocated to the module in the controller. The controller can, for example, convey data, information, and control commands, which are transmitted to the address, to the module. On the other hand, the data can also be transmitted from the module to the controller if they are requested or required by the respective module address.

Depending on how many modules it is intended communicate with one another, for example M modules, the number A of address contacts must be adapted. If it is intended for just one physical variable, for example the voltage, to be measured, and this exists in just two states, for example a high amount of voltage or no voltage, or alternatively negative voltage and positive voltage, at least $Log2(M)$ address contacts are always needed, wherein $Log2(M)$ must be rounded up to the next highest natural number. If it is intended, for example, for 5 modules to communicate with one another, 3 address contacts are needed because there are then 9 different options for contacting (000, 100, 010, 001, 110, 101, 011, and 111). If it is intended for just 4 modules to come into contact with one another, 2 address contacts are sufficient because there are then 4 different options for contacting (00,01,10,11). If it is intended for further data and information to be communicated via the address contacts, this must be taken into account when choosing the number of address contacts.

The controller can read or measure the assignment of the address contacts of the interface in order to allocate an address. Thus, for example, the combination of physical measurements which are present at the interface is associated with the module.

Assignment of two address contacts can, for example, consist in a high electrical voltage being present at the first address contact whilst there is no electrical voltage present at the second address contact.

The module can, for example, as a whole be equipped such that it possesses a controller, the hardware of which possesses two contact surfaces to which a voltage can be applied. The software of the controller detects these voltages and gives the module an address which is associated with the combination of voltages at the contact surfaces.

In an embodiment, the address contacts can be contacted with a connector by means of in each case one addressing pin and connected to electrical potentials.

A connector is here a device for connecting a cable harness to the battery management controller interface. A connector can have means which enable the connector to be interlocked with the connector counterpart, for example of the battery management controller interface. A connector can be standardized, for example, also with a specific external geometry and can contain connecting elements via which data and information from the cable harness can be transferred. A connector can be designed, for example, in the form of a plug or a socket in order in this way to be able to produce a plug connection.

Such connecting elements can be so-called addressing pins. Addressing pins can be conductive raised parts or depressions which are made in or on the connector. One side of the addressing pins can be connected to in each case one of the cables of the cable harness. The other side of the addressing pins can then transport the data and information from the cable harness to the battery management controller interface.

The data and information can be transported and generated in particular via electrical potentials, as described above.

The address contacts of the battery management controller interface can normally also be connected to a first potential and have a second potential applied to them by contact with the addressing pin.

In particular, secure retention of the addressing pins at or on the address contacts can be ensured by the connector. The use of electrical potentials enables simple, secure, and direct communication with the electronics of the battery management controller.

The connector can in particular be a CAN connector, wherein the first potential is the ground of the CAN connector and the addressing pins are the freely selectable pins of the CAN connector.

CAN is here an abbreviation of Controlled Area Network and is a serial bus system and is used in particular in vehicles for communication between different parties.

The first potential of the connector can be connected to the ground of the CAN plug connector. The second potential can be applied to the battery management controller interface via the freely selectable or assignable pins of the CAN plug connector.

In particular, compatibility of the battery management controller communication with other components can be ensured by the use of a CAN connector. It furthermore allows the use of established hardware and established methods and protocols, in particular communication protocols, which are typical and/or standardized in motor vehicles.

The electrical connection between an addressing pin and a first potential can here be interpreted by the battery management controller in particular as a logical 0, and an electrical connection between an addressing pin and a different second potential can be interpreted by the battery management controller as a logical 1.

Alternatively, instead of a second potential, the respective addressing pin can also simply remain unconnected such that the battery management controller can distinguish between a defined (first) potential and an undefined potential for the unconnected addressing pins and interprets them accordingly in each case as a logical 0 and a logical 1.

This has the advantage that a distinction only needs to be made between two potentials such that the communication is less prone to error than when a distinction needs to be made between an unspecified number of potentials which need to be processed.

The first potential can, for example, be connected to ground (GND), whilst the second potential is 5 volts. If the potentials GND, 5V, 5V, GND, GND are, for example, then present at a connector with 5 addressing pins, these potentials are transmitted to the battery management controller interface where they are interpreted by the battery management controller as "01100".

The combination of the electrical connections of the addressing pins can be interpreted by the battery management controller as an address.

This has the advantage that a complex physical variable, which can be used in the further method for communication with the battery module, can be encoded via simple assignment of the addressing pins.

A control command can thus, for example, be transmitted to the address "01100" such that only the battery module with the abovementioned address reacts to the control command.

The topology of the battery module and/or the battery system, in particular the role of the battery module in the topology of the battery system, can be encoded in the address of the battery module.

The topology of an electrical system indicates the interconnection of the electronic components. For example, the topology of the battery module contains information on the interconnection of the battery cells. The topology of the battery system thus contains information on the interconnection of the battery modules.

The role of a battery module in the topology can comprise information on the interconnection of the battery module, the position in the overall system, the voltage, and further properties.

This has the advantage that allocation of the different components is already enabled in the address such that the address already contains information on the overall system. It is thus in particular possible to perform simple plausibility evaluations between the information of the address and other status variables of the system. This can result in particular in the creation of protective mechanisms which provide protection against faulty operation of the battery system.

For example, the address "1011" can be allocated to a battery. The first bit of the address could, for example, represent that the battery module is connected in series to another battery module. The numeric number which results from each address, "1011", corresponds to the number $1 \cdot 2^3 + 0 \cdot 2^2 + 1 \cdot 2^1 + 1 \cdot 2^0 = 8 + 2 + 1 = 11$. The numeric number could here represent an identification number of the battery module which specifies a certain location of the battery module in the overall system during the production process. It is thus also possible that the last bit indicates whether the battery module is situated on the right-hand side of the overall system or on the right-hand side of the overall system relative to a predetermined reference point. The first bit can, for example, mean whether the battery module is connected in series to another battery module. If the first bits of these two battery modules connected in series differ, the system can display an error message.

It is moreover possible that module is the battery management controller or the battery management controller is interconnected with the module or the module is integrated into the battery management controller.

It is thus also possible, for example, for existing battery management controllers to be retrofitted to a module such that an address is allocated to the existing battery modules by the module.

A module for constructing a battery system for a vehicle, in particular a control module, is also proposed, wherein the module has a controller and an interface, wherein the interface has at least two address contacts for assigning an address to the module and a controller, wherein the controller is designed and configured to detect the assignment of the at least two address contacts and to derive an address for the module therefrom.

A cable harness with a plurality of connectors for connecting a plurality of battery modules is likewise provided, wherein the connectors are assigned to the address contacts of the battery modules in different fashions.

A cable harness is a multi-part and electrically conductive connection with a plurality of branches leading to and from it. A cable harness can improve in particular the organization of cables when interconnecting multiple components. In particular, by virtue of a cable harness multiple devices can communicate with one another via the same wires.

A connector can be situated at each branch leading to and from the cable harness. This connector can be, for example, a CAN connector or alternatively a different connector. In particular, the contacts of the connector can be connected by the cables of the cable harness. In particular, a plurality of connectors can be connected and contacted with one another via the same cables.

Different assignment of the address contacts of the battery modules can result in a unique and unambiguous address and make it possible to identify the battery modules in the overall system. Different assignment can be achieved by the combination of the electrical connections of the connector with the address contacts in the system being used only once.

For example, when two battery modules are connected together, a first battery module can be connected to a connector, where the first addressing pin is connected to ground (0) and 5V is present at the second addressing pin (1) and the battery module is thus allocated the address "01", and a second battery module can be connected to a connector, where 5V is present at the first addressing pin and the second addressing pin is connected to ground and the battery module is thus allocated the address "10". The address contacts of each battery module are then assigned differently. This makes it possible to identify and address the various battery modules unambiguously.

The cable harness can be constructed in a modular, in particular expandable form.

Constructed in a modular form means that the whole cable harness can be composed of sections. Each section here has at least one input to which a section can be fitted and at least two outputs to which further cable harness sections can be connected. If further cable harness sections are connected to a cable harness section, it is expanded.

A modular structure in particular has the advantage that just one model of a cable harness section needs to be produced and this one section can be combined to form a whole cable harness. The length of the cable harness and the number of connectors can here be freely selected such that only as many cable harness sections need to be constructed as there are connectors required.

The cable harness can connect some of the addressing pins of the connectors to the same electrical potential and in particular to the same ground.

This enables the addressing pins to be able to access a common connection.

For example, the connectors can access a common ground wire such that all the modules or battery management controllers are connected to the same ground. This can reliably prevent electric flashovers and in addition form a common basis for communication between the various battery management controllers.

The cable harness can be integrated into the high-voltage cable harness and/or designed in parallel thereto and/or linked thereto.

The various battery modules are interconnected in the high-voltage cable harness to form the whole battery with a total voltage and a total capacity. For example, two 400V battery modules can be interconnected in series to form an 800V battery. The cable harness for communication between the battery modules can be designed in parallel to the high-voltage cable harness such that, in the case of a predetermined high-voltage topology, the cable harness and the high-voltage cable harness are assembled together and confusion between the high-voltage topology and the communication ports is avoided. The cable harness can, for example, run parallel to the high-voltage cable harness through cable clips such that there is a spatially suitable relationship for each connector for the battery management controller interface and the connectors for the high-voltage topology, which ensures that both the correct connector and the correct battery connector are allocated to each battery module.

The high-voltage topology inside the overall battery system is determined fundamentally via the high-voltage cable harness. The cable harness for communication between the battery modules can therefore also be integrated into the high-voltage cable harness such that the communication lines and the power lines lie parallel to one another. Confusion can be avoided as a result. The use of an integrated cable harness in the high-voltage cable harness can ensure that the high-voltage topology is consistent with the address allocation to the battery modules. Incorrect configurations are thus avoided.

A battery system with at least one battery module and a cable harness is likewise provided, wherein the battery modules are brought together with the cable harness in a central control unit.

A battery system is the interconnection of a plurality of battery modules. This interconnection is effected, for example, by a cable harness. Connectors, to which the address contacts of the battery modules are assigned, can be connected to the cable harness. As a result, addresses can be allocated to the contacted battery modules by the respective battery management controllers.

The various packs can be connected to a central control unit. This central control unit can, for example, detect which battery addresses have been allocated in the battery system. The central control unit can furthermore regulate the communication between the battery modules or communicate with the individual battery modules.

The central control unit can, for example, also allocate specific roles in the overall topology to the battery modules via a master-and-slave system.

The central control unit can assign the various addresses of the battery modules of the battery system to an overall topology.

The overall topology reflects the overall interconnection of the battery modules with a total capacity and a total voltage.

This has the advantage that the central control unit can draw conclusions about its respective operating mode with the aid of the overall topology. Furthermore, plausibility evaluations, which protect the battery system from faulty operation, can also be performed using the information on the overall topology.

The central control unit can, for example, detect with the aid of the addresses whether battery modules are interconnected in series. For example, it is possible to store in the central control unit the fact that batteries are interconnected in series if the first address bit is 1.

If, for example, the position of the battery module is also conveyed in the address, the central control unit can detect battery modules interconnected in series. For example, a battery module with the address "1011" can be connected in series with the battery module with the address "0011". The central control unit can manage the battery modules with the addresses "1011" and "0011" as a unit with the aid of this allocation.

The central control unit can be designed in the battery module or be independent and/or the central control unit can be formed by the module.

This has the advantage that a communication interface can be retrofitted to pre-existing battery systems. In particular, however, pre-existing battery modules and battery management controllers can also, in a resource-efficient fashion, assume the role of a central control system and monitor tasks, communication, and hierarchies in the battery system.

The battery system, in particular the connector, can, in the case of installation of a battery module in the battery system, allocate the address according to the assignment of the addressing contacts of the connector and allocate this same address to a new battery module when the battery module is changed or replaced.

Because the connector is assigned to the address contacts of the battery module, when a change is made the communication with the battery module can be assumed using the address of the old battery module.

This has the advantage that the topology and the structure of the battery system are independent of the battery controller used. In particular, when changing a battery module, it is also impossible for there to be any duplicated addresses because the information for the addressing is stored in the connector. Recognition of the battery modules is ensured by the assignment of the connectors.

A method for communication between a central control unit and at least one battery module is also described herein according to various embodiments.

In the method, the central control unit can communicate with the battery module via the assigned address and/or transmit the assigned address when communicating with the battery module and/or identify the battery module by the assigned address.

This has the advantage that the communication commands are transmitted and received via a communication port common to all the battery modules but only one specified or addressed battery module actively carries out the communication commands.

For example, the central control device can, via one overall command via the CAN bus, enquire about the addresses of the connected battery modules. The responses of the individual battery modules can then be processed and, for example, registered in the central control device. For example, the various addresses can then enquire about the battery module voltages at regular intervals. For example, the battery modules can transmit their addresses when communicating with the control device such that allocation in the central control device is possible.

BRIEF DESCRIPTION OF THE FIGURES

Further embodiments of the invention are explained in detail by the following description of the drawings.

FIG. 2 shows a tabular illustration of various address contact assignments;

FIG. 6 shows possible connectors;

DETAILED DESCRIPTION

Exemplary embodiments are described below with the aid of the drawings. Elements which are the same, are similar, or have the same effect are here provided with identical reference symbols in the different drawings and a description of these elements has in some cases not been repeated in order to avoid redundancy.

Figure 1:
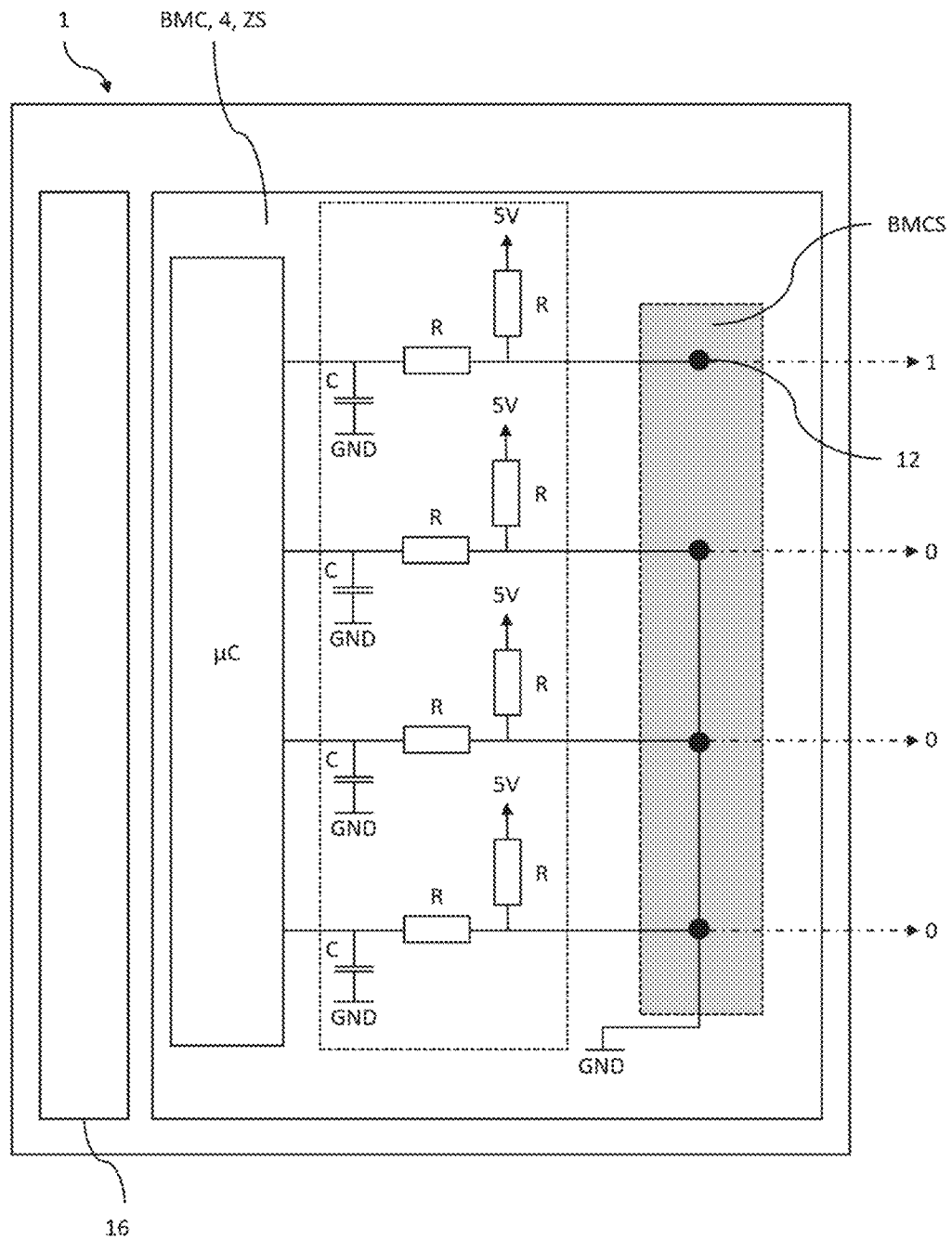
FIG. 1 shows a schematic illustration of a battery module.

A battery module 1 is shown schematically in FIG. 1. The battery module 1 comprises a battery cell 16, a battery management controller BMC, and a battery management controller interface BMCS.

The battery management controller interface BMCS has four address contacts 12. The battery management controller moreover has a microcontroller µC in which data and information can be processed. The address contacts 12 are connected to the addressing pins 14 of a connector 10 (not shown here). Three address contacts 12 are connected to ground by the assignment of the addressing pins 14. One address contact 12 here remains unassigned. The unassigned address contact is interpreted by the microcontroller µC as "1", and the address contacts 12 which are connected to ground are interpreted as "0". The battery management controller thus allocates the address "1000" to the battery module.

The various assignment options for the address contacts 12 of a battery module 1 having four address contacts 12 are shown in tabular form in FIG. 2. This table can be saved, for example, in a memory of the battery management controller BMC and be used as a so-called look-up table. With the aid of the connector 10 connected to the battery management controller BMC and its assignment, the battery management controllers BMC allocate the corresponding address to the battery module 1 to detect its role in the overall system.

The address contacts 12 are numbered in descending order and begin with address contact number 4 ADR4, going down to address contact number 1 ADR1. The column headed "Dec" gives the decimal number which corresponds to the binary address. So, for example, "1111"=$1 \cdot 2^3 + 1 \cdot 2^2 + 1 \cdot 2^1 + 1 \cdot 2^0 = 8+4+2+1=15$. The column headed "ECU type" gives the type of the electronic control unit (ECU). So, for example, so-called "vehicle interface boxes" (VIB), such as for example a central control unit ZS, are also provided along with battery management systems BMS.

The role of the battery module 1 is specified in the column headed "ECU subtype". If the battery module 1 is connected to a "1111" connector, it is an individual, independently controlled battery module 1 ("Standalone"). If a battery management controller BMC is connected to the connector ("plug") "0000", it detects that it assumes the role of a central control unit ZS ("VIC") and controls, for example, a 400V battery system.

The battery system 3 can, for example, be specified such that the battery modules 1 are interconnected once in series and x times in parallel (1sXp). If the battery management controller BMC is connected to a "1000" connector, it detects, for example, that it controls an 800V battery system 3, wherein two battery modules 1 are connected in series and these two battery modules 1 are connected in parallel to other x pairs of battery modules (2sXp).

If the battery management controller BMC is connected, for example, to a "0110" connector 10, it detects its role as a "slave" and is thus subordinate to another control unit. Different identifiers, listed in the column headed "Pack ID", can also be associated with the address. For example, the pack ID 0 can be allocated to central control devices ZS and standalone battery modules.

Other battery modules 1 with the ECU subtype "Slave" can then be numbered consecutively in ascending order with the aid of their binary address. The column headed "Pack name" gives the names of the respective battery module. In each case, the first digit in the pack name indicates the position within a serial battery system structure and the second digit indicates the position within a battery system structure connected in parallel.

It is consequently possible to identify the respective slave parties unambiguously and to obtain a definition of the overall topology in the central control device ZS.

As shown in the table, it is possible to perform cost-effective and stable addressing of the battery modules 1 without great effort just by using four dedicated addressing pins, it additionally being possible to extract or assign a great deal of further information from the system using the so-called integrated 4-bit coding scheme.

Allocating addresses to packs using the connector configuration additionally makes it easier to manage variants between different battery system solutions. Because different customers with different desired high-voltage topologies need to be supplied with a central control unit ZS, no distinctions must be made for the use of the central control unit ZS in the production of this solution. This facilitates the logistics.

By virtue of the demonstrated addressing scheme, it is additionally possible to configure a very wide range of different high-voltage topologies of an overall system without cost-intensive readjustment of programming or hardware changes to the central control unit ZS.

Figure 3:
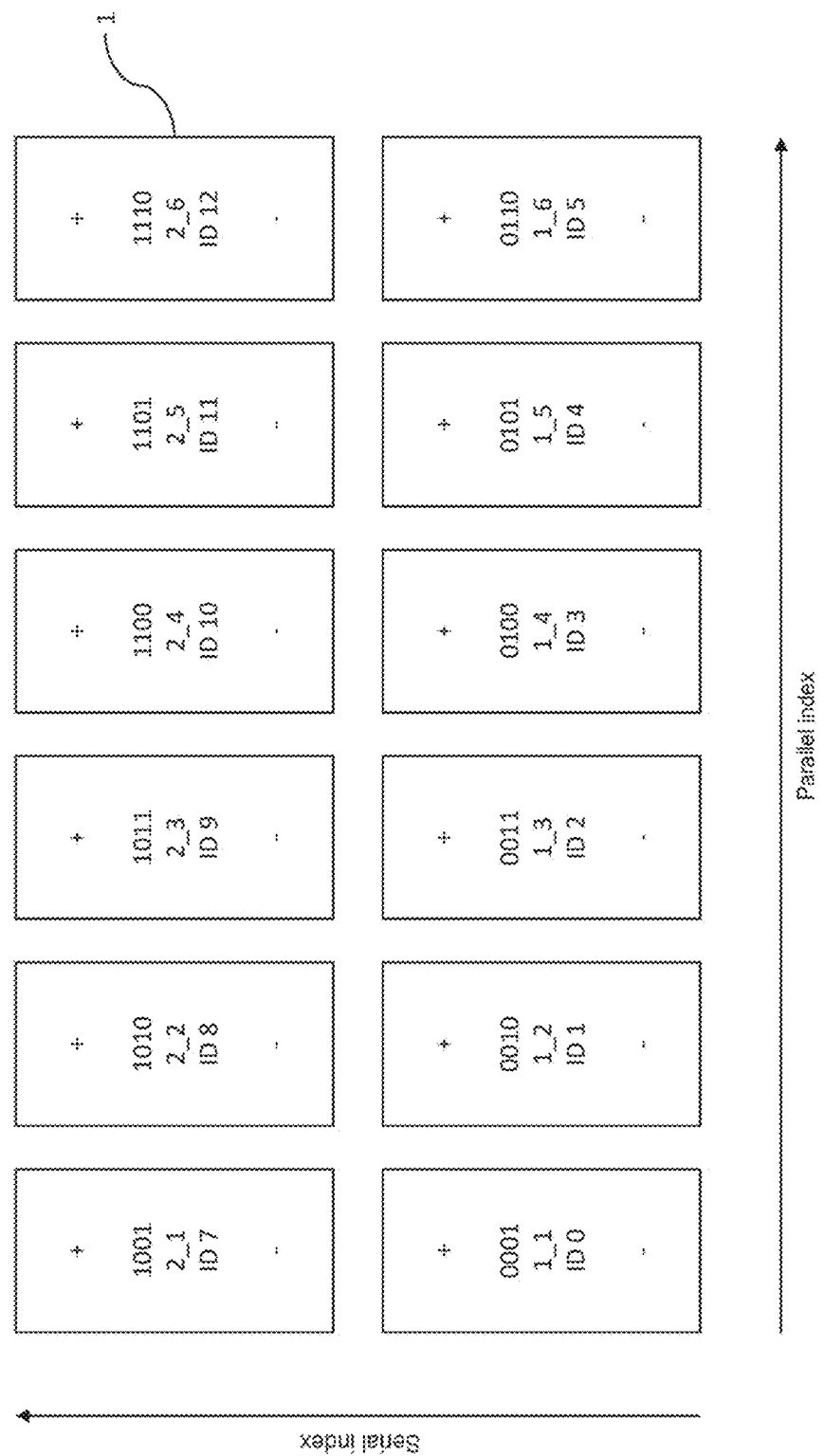
FIG. 3 shows a schematic structure of a battery system.

The arrangement of battery modules 1 in a battery system 3 is shown schematically in FIG. 3. The serial index, i.e. the first digit in the "pack name" is here specified on the y-axis. The parallel index, i.e. the second digit of the "pack name" is specified on the x-axis. Different battery cells are arranged in the xy plane. The polarity in the respective battery cells is marked by +/−. In the first row, the identifier states the allocated address, and the second row specifies the pack name. The third row specifies the respective ID. All the identifiers have been taken from the table in FIG. 2. It can be clearly seen that battery modules 1 with the same parallel index are placed next to one another, whilst battery modules 1 with the same serial index are arranged above one another.

Figure 4:
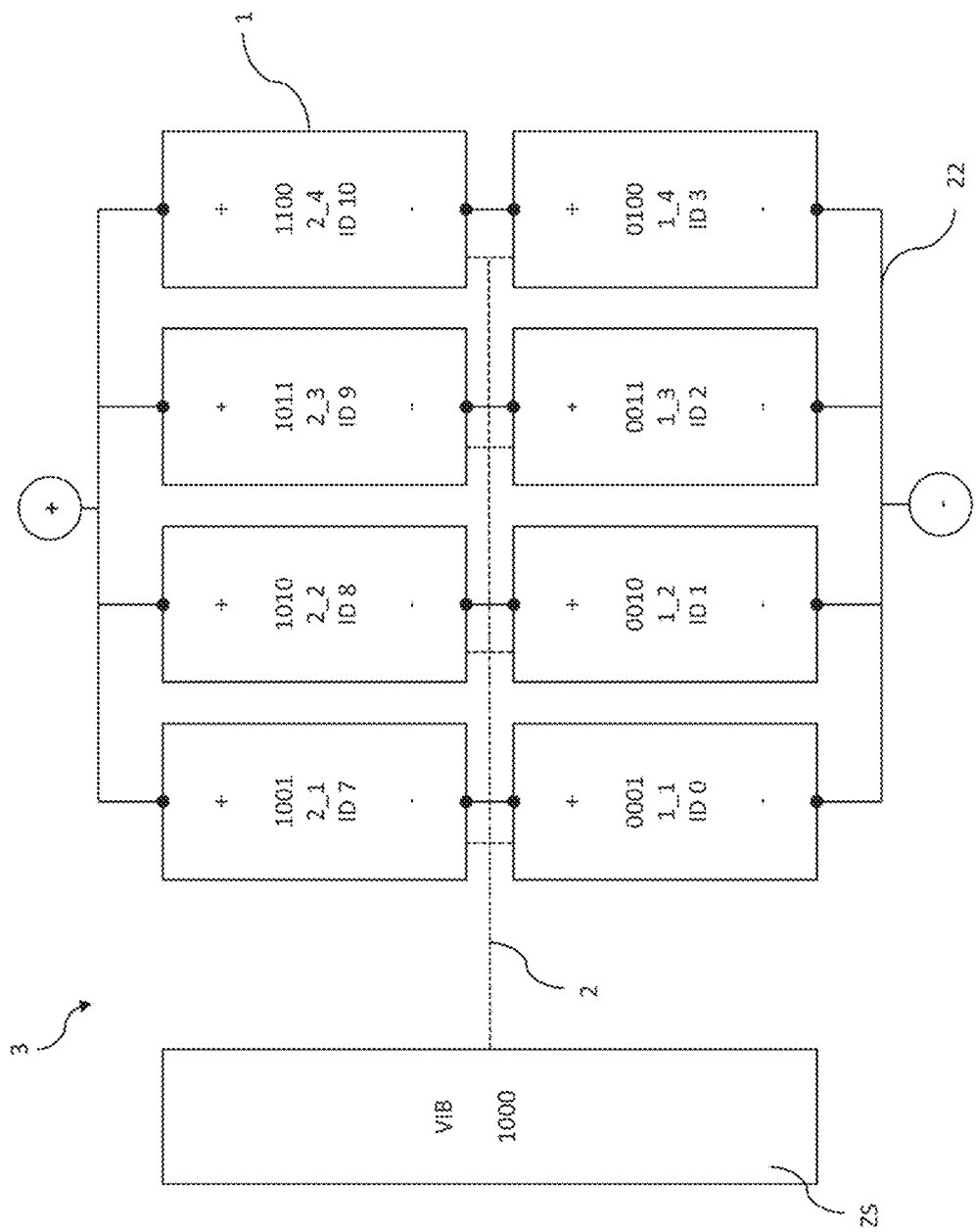
FIG. 4 shows a schematic structure of a 2s4p battery system.

FIG. 4 shows the schematic structure of a 2s4p battery system 3. In each case two of the battery modules 1 with the IDs 0 to 3 and 7 to 10 are interconnected in series via the high-voltage cable harness 22 such that the voltages of the two battery modules 1 are added to each other. In all, four pairs of battery modules interconnected in series are also interconnected in parallel such that the capacities of all the pairs of battery modules are added to one another. The battery modules are additionally connected to a VIB via a cable harness 20 with connectors (not shown). The VIB has been allocated the address "1000" via the connector such that the VIB assumes the role of the central control unit ZS of the 800V system with a 2s4p topology.

If one of the battery modules 1 is changed and replaced by a new battery module 1, then the address and the properties of the previous battery module 1 are allocated to the new one via the connector such that problem-free changing and maintenance of the battery modules are possible, wherein all that is needed to allocate the respective address is simply to plug in the respective connectors 10.

Figure 5B:
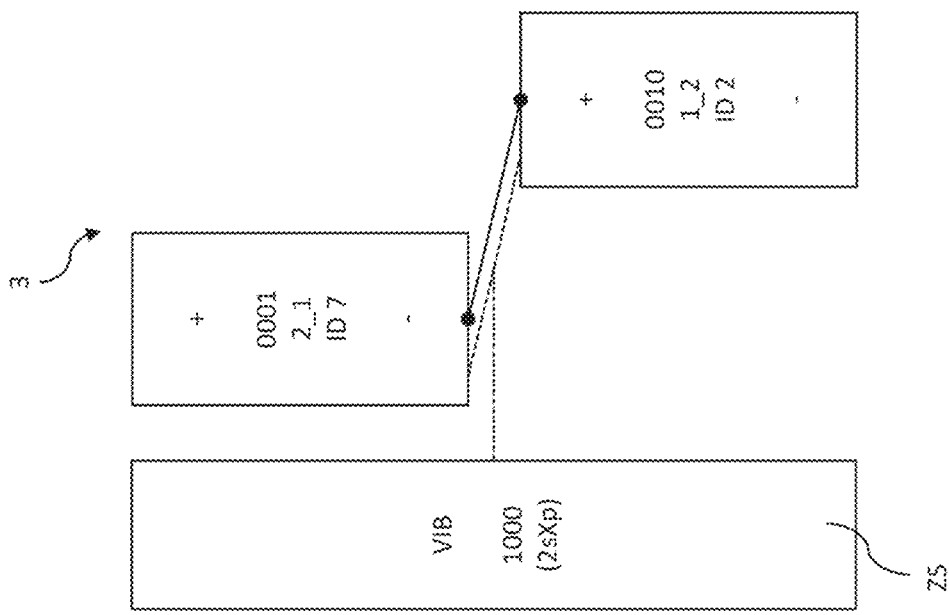
FIG. 5 shows a schematic illustration of a plausibility evaluation.
Figure 5A:
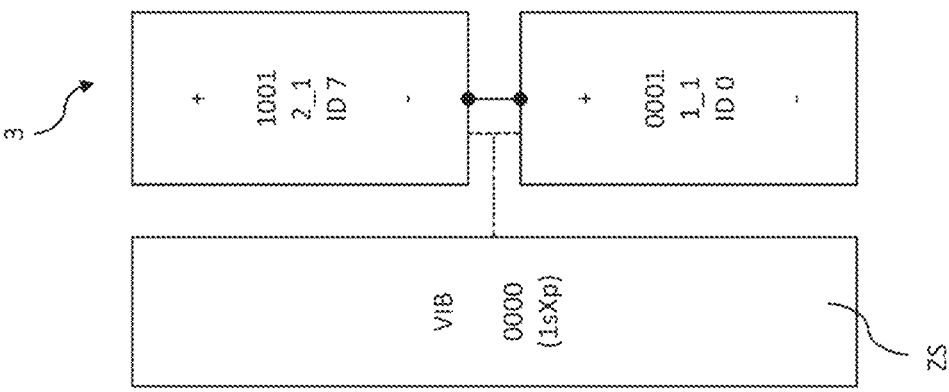

One possible plausibility evaluation, which can provide protection from faulty operation of the battery system 3, is shown in FIG. 5. In particular, communication errors which occur and misuse of the battery system are detected and tested for plausibility. In FIG. 5A, although the battery modules 1 are interconnected correctly because the parallel indices of the battery module 1 match, an address "0000" which controls a battery system 3 in which the battery modules are not interconnected in series has been allocated to the central control unit ZS. This discrepancy between the information of the central control unit ZS and the information on the topology of the battery cells can result in an error message which indicates the faulty interconnection and thus protect the battery cells from damage. In FIG. 5B, although the correct address for a serial connection of the two battery modules 1 has been allocated, the parallel indices of the two linked battery modules 1 do not match. This can be interpreted by the central control device ZS as a possibly faulty connection such that an error message is displayed. As a whole, the system can check whether the specified topology of the central control unit ZS matches the information of the battery modules 1.

Possible embodiments of the connector 10 are shown in FIG. 6. The connector 10 in FIG. 6 is a CAN connector 100 which has five addressing pins 14. The addressing pins 14 are characterized in the Figure in that they are either black or white. Shaded pins represent communication pins which are not required simply for the addressing and ensure the functionality of the CAN communication. Because different pins are normally used for communication via the CAN bus, the freely selectable pins of the CAN must be selected for correct addressing. It is assumed here that the pins 2, 4, 5, as well as 8 and 9, can be freely assigned for CAN communication. Pin number 3 is normally connected to ground. The addressing pins 14 can, for example, also be connected to ground via the CAN ground if the connector is configured accordingly. The addressing pins 14 connected to ground are then registered by the address contact 12 and interpreted by the battery management controller as "0". The address contacts 14' are not connected to ground and are therefore interpreted as "1".

A standard CAN connector 100, and an address connector 102, are shown in FIG. 6B. The address connector 102 is connected to the CAN connector 100 via an electrical line. The addressing pins 14 of the address connector 102 can thus use the ground of the CAN connector 100.

A combined connector 104 with 15 pins, the pins 6 and 8, and 14 and 15, of which are the addressing pins 14, can be seen in FIG. 6C. In particular communication pins and addressing pins 14 and 14' are situated in the connector in FIG. 6C.

Figure 7:
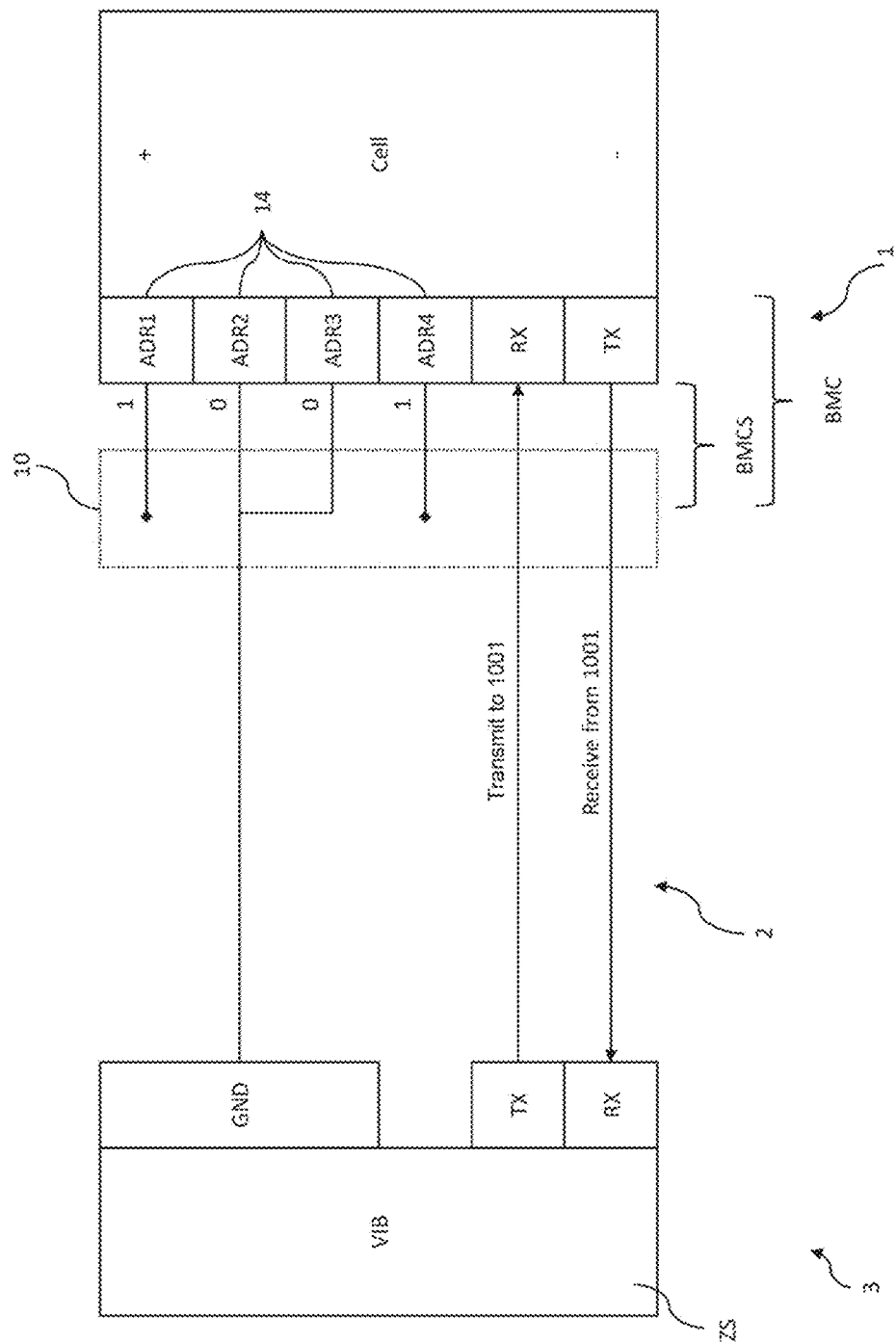
FIG. 7 shows a schematic illustration of the functioning of a connector.

The functioning of a connector 10 is shown schematically in FIG. 7. The address contacts 14 of the battery management controller interface are assigned via the connector 10. For example, the address contacts 14 labeled ADR2 and ADR3 are connected to the ground of the central control unit ZS via the connector. The address contacts labeled ADR1 and ADR4 remain unassigned. The unassigned address contacts 14 are interpreted by the battery management controller as "1". The assigned address contacts 14 are interpreted by the battery management controller as "0". Thus, in the example 1001 results as the address for the battery module 1.

The central control unit ZS and the battery module 1 can exchange data and information via the transmit and receive lines (TX and RX) of the cable harness 20. For example, the central control unit ZS can communicate with the specific battery module 1 by using the registered address of the battery modules 1 for the communication. The battery module 1 can then also transmit its address in its response such that it is possible to allocate the response to the corresponding battery module 1.

Figure 8:
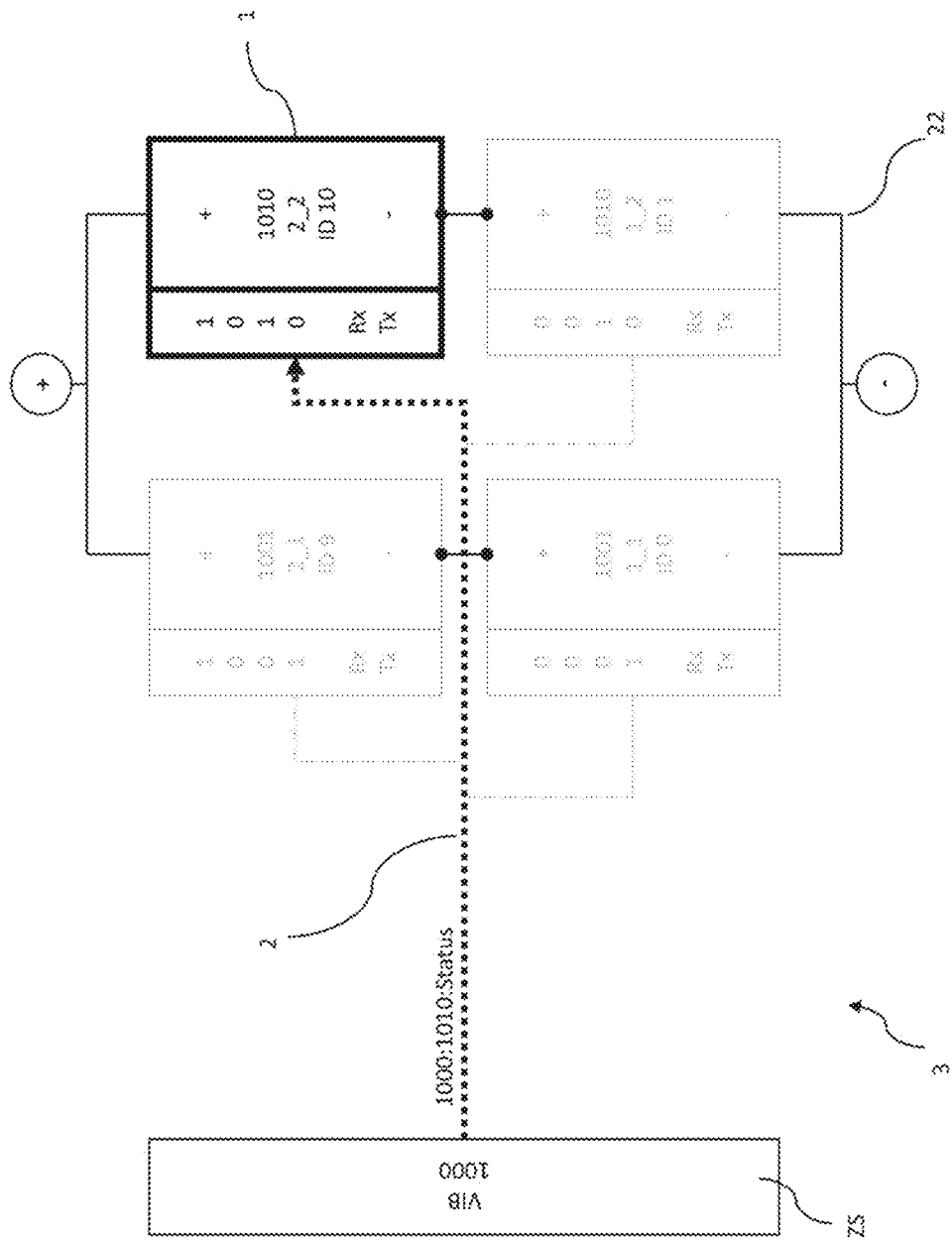
FIG. 8 shows a schematic illustration of the communication between a battery module and a central control unit.

The communication scheme between the battery module 3 and a central control unit ZS is illustrated in FIG. 8. A 2s2p battery system 3 with a total of four battery modules 1 is shown. The central control unit ZS transmits a control command, for example "1000: 1010-V?", to the whole battery system 3. The command structure can, for example, be such that the first communication block contains the address of the sender, here "1000". The receiver can thus check the reliability of a subsequent inquiry with the aid of the system hierarchy. The second communication block contains the address of the receiver, here "1010". The receiver block is read by all the battery modules 1 of the battery system 3. The third block can contain the specific inquiry, here "status".

Only the battery module 1 with the specified receiver address processes the "status" command and then returns, for example, the current temperature and the current voltage to the central control unit ZS. This information is, however, returned in a specified fashion to the address "1000" and is thus processed only selectively in the battery system 3. If the battery module 1 with the address 1010 is changed, the new battery module 1 receives the same address because the addressing contacts are assigned by the addressing pins of the connector. The communication is thus independent of a program of the respective battery module 1.

Figure 9:
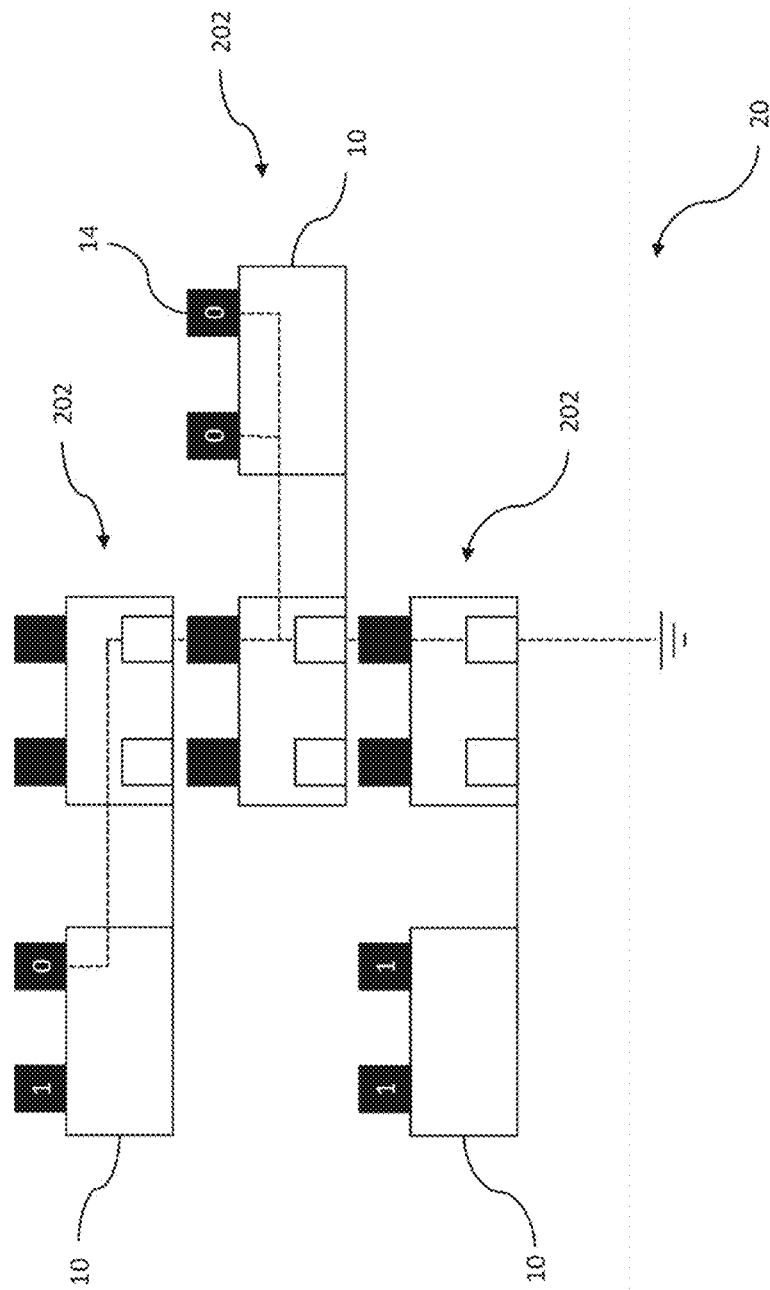
FIG. 9 shows a schematic illustration of a modular cable harness.

A schematic illustration of a modular cable harness 20 is shown in FIG. 9. Each cable harness section 202 has at least one input and two outputs. This makes it possible to interconnect the different cable harness sections 202. The different addressing pins of the connectors 10 can moreover be connected to the same ground by the cable harness if the ground contact is looped through the cable harness. Depending on how many battery modules are to be used in the battery system, such a cable harness can easily be expanded by attaching new cable harness sections.

Where applicable, all the individual features which are illustrated in the exemplary embodiments can be combined with one another and/or swapped without going beyond the scope of the invention.

The invention claimed is:

1. A battery module for constructing a battery system for a vehicle, comprising:
   a battery cell; and
   a battery management controller (BMC) having a battery management controller interface (BMCS), wherein:
      the BMCS comprises two address contacts configured to assign an address to the battery module,
      the BMC is configured to detect an assignment of the two address contacts and derive the address of the battery module therefrom,
      each of the two address contacts is contacted with a controlled area network (CAN) connector via an addressing pin, and the two address contacts are connected to electrical potentials,
      an electrical connection between a first addressing pin and a first potential is interpreted by the BMC as a logical 0, and an electrical connection between a second addressing pin and a free potential is interpreted by the BMC as a logical 1,
      a combination of electrical connections of the two addressing pins of the BMC is interpreted as the address of the battery module,
      a role of the battery module in a topology of the battery system is encoded in the address of the battery module, and
      the BMC is further configured to detect its role in the topology of the battery system with an aid of the connector connected to the BMCS and an assignment of the connector.

2. The battery module of claim 1, wherein an electrical connection between the second addressing pin and a different second potential is interpreted by the BMC as a logical 1.

3. The battery module of claim 1, wherein the first potential is the ground of the CAN connector, and the two addressing pins are selectable pins of the CAN connector.

4. The battery module of claim 1, wherein a topology of the battery module and/or the topology of the battery system is encoded in the address of the battery module.

5. A battery system comprising:
   the battery module of claim 1; and
   a cable harness having two connectors configured to connect two battery modules comprising the battery module of claim 1 and another battery module, wherein the two connectors are assigned to address contacts of the two battery modules in different fashions, wherein the two battery modules are joined together with the cable harness in a central control unit.

6. The battery system of claim 5, wherein different addresses of the two battery modules are assigned to an overall topology in the central control unit.

7. The battery system of claim 5, wherein:
   the central control unit is designed in a battery module,
   the central control unit is designed independent of the battery module, and/or
   the central control unit is formed by a control module.

8. A method for communicating between a central control unit and the battery module of claim 1, comprising:
   communicating, by the central control unit, with the battery module via the assigned address of the battery module;
   transmitting, by the battery module, the assigned address of the battery module when communicating; and/or
   identifying, by the central control unit, the battery module by the assigned address of the battery module.

9. A control module for constructing a battery system for a vehicle, comprising:
   a controller with an interface, wherein:
      the interface comprises two address contacts configured to assign an address to the control module,
      the controller is configured to detect an assignment of the two address contacts and to derive an address of the control module therefrom,
      each of the two address contacts is contacted with a controlled area network (CAN) connector via an addressing pin, and the two address contacts are connected to electrical potentials,
      an electrical connection between a first addressing pin and a first potential is interpreted by the controller as a logical 0, and an electrical connection between a second addressing pin and a free potential is interpreted by the controller as a logical 1, a combination of electrical connections of the two addressing pins of the controller is interpreted as the address of the control module, a role of the controller in a topology of the battery system is encoded in an address of the battery module, and the controller is further configured to detect its role in the topology of the battery system with an aid of the connector connected to the interface and an assignment of the connector.

10. The control module of claim 9, wherein an electrical connection between the second addressing pin and a different second potential is interpreted by the controller as a logical 1.

11. The control module of claim 9, wherein the first potential is the ground of the CAN connector, and the two addressing pins are selectable pins of the CAN connector.

12. The control module of claim 9, wherein the topology of the battery system is encoded in the address.

* * * * *